(12) United States Patent
Lovett

(10) Patent No.: US 6,278,562 B1
(45) Date of Patent: Aug. 21, 2001

(54) RADIATION FILTER USED IN WELDING APPARATUS

(75) Inventor: Donald C. Lovett, Shelton, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 09/350,730

(22) Filed: Jul. 9, 1999

Related U.S. Application Data

(62) Division of application No. 08/890,323, filed on Jul. 9, 1997.

(51) Int. Cl.[7] .................................................. G02B 5/24

(52) U.S. Cl. .................... 359/886; 359/885; 359/892; 392/408; 392/407; 250/493.1; 250/495.1; 250/503.1; 156/272.2; 156/380.9; 219/617; 219/85.12

(58) Field of Search ..................................... 359/886, 892, 359/885; 256/503.1, 493.1, 495.1; 219/617, 85.12, 85.13; 392/408, 407; 156/272.2, 380.9

(56) References Cited

U.S. PATENT DOCUMENTS

| | | |
|---|---|---|
| 3,247,041 | 4/1966 | Henderson . |
| 3,560,291 | 2/1971 | Foglia . |
| 3,586,417 | 6/1971 | Fields . |
| 3,666,907 | 5/1972 | Nugent et al. . |
| 3,801,773 | 4/1974 | Matsumi . |
| 3,804,691 | 4/1974 | Trivedi . |
| 3,879,164 | 4/1975 | Haldopoulos et al. . |
| 3,914,010 | 10/1975 | Zeller . |
| 3,956,053 | 5/1976 | Staats . |

(List continued on next page.)

FOREIGN PATENT DOCUMENTS

| | | |
|---|---|---|
| 0 538 864 A2 | 4/1993 | (EP) . |
| 1506163 | 12/1966 | (FR) . |
| 2685102 | 6/1993 | (FR) . |
| 2125 | 4/1910 | (GB) . |
| 468689 | 7/1937 | (GB) . |
| 2277808 | 9/1994 | (GB) . |
| 6510316 | 2/1967 | (NL) . |
| WO 93/00212 | 1/1993 | (WO) . |
| WO 94/22661 | 10/1994 | (WO) . |
| WO 96/40517 | 12/1996 | (WO) . |

OTHER PUBLICATIONS

Robert A. Grimm, "Through–Transmission Infrared Welding of Polymers", ANTEC '96, May 5, 1996, pp. 1238–1244.

Ou, B.S., et al. "Laser Welding of Polyethylene and Polypropylene Plates", ANTEC '92, pp. 1764–1767.

Lever, R.F., "Applying Radiant Heat to Semiconductor Integrated Circuits", IBM Tech. Disclosure, vol. 20, No. 10, Add 3. Mar. 1978.

Yang S. Chen, et al. "Infrared Welding of Polybutylene Terephthalate", ANTEC '95, pp. 1248–1251.

Branson, "Plastics Joining Technology", Branson Ultrasonics Corporation, 1994.

*Primary Examiner*—Cassandra Spyrou
*Assistant Examiner*—Leo Boutsikaris
(74) *Attorney, Agent, or Firm*—Harness, Dickey & Pierce, P.L.C.

(57) ABSTRACT

A filter for absorbing electromagnetic radiation which is used in heating a welding zone wherein a first part is joined to a second part. The filter includes a filter housing which contains a chamber within which a fluid is placed. The fluid absorbs undesired wavelengths of radiation from a heating source before the radiation reaches the welding zone. A heat exchanger may be connected to the filter in order to cool the fluid during the filtering process.

19 Claims, 1 Drawing Sheet

U.S. PATENT DOCUMENTS

| | | | |
|---|---|---|---|
| 4,337,998 | * 7/1982 | Basiulis | 359/886 |
| 4,419,304 | 12/1983 | Ficke et al. . | |
| 4,575,608 | 3/1986 | Wictorin et al. . | |
| 4,636,609 | 1/1987 | Nakamata . | |
| 4,944,125 | * 7/1990 | Ito | 359/886 |
| 4,985,814 | 1/1991 | Lyons . | |
| 5,083,852 | * 1/1992 | Thompson | 359/886 |
| 5,113,479 | 5/1992 | Anderson et al. . | |
| 5,151,149 | 9/1992 | Swartz . | |
| 5,177,340 | 1/1993 | Zaffiro . | |
| 5,271,872 | * 12/1993 | Sallavanti | 359/885 |
| 5,286,327 | 2/1994 | Swartz . | |
| 5,300,356 | 4/1994 | Dempster et al. . | |
| 5,313,034 | 5/1994 | Grimm et al. . | |
| 5,338,492 | 8/1994 | Panzer et al. . | |
| 5,348,604 | 9/1994 | Neff . | |
| 5,444,814 | 8/1995 | Hofius, Sr. . | |
| 5,520,801 | 5/1996 | Gerber et al. . | |
| 5,522,954 | 6/1996 | Bennett et al. . | |
| 5,538,626 | 7/1996 | Baumann et al. . | |
| 5,840,147 | * 11/1998 | Grimm | 156/272.2 |
| 6,016,232 | * 7/1982 | Leib | 359/886 |

* cited by examiner

RADIATION FILTER USED IN WELDING APPARATUS

This is a division of U.S. patent application No. 08/890,323, filed Jul. 9, 1997.

BACKGROUND AND SUMMARY OF THE INVENTION

The present invention relates generally to welding. It relates more particularly to an improved method and apparatus for welding plastics and like materials utilizing electromagnetic radiation.

Welding is commonly used to join plastic or resinous parts, such as automobile thermoplastic parts, at a welding zone. Lasers have been used to provide the heat necessary to perform the welding operation (for example, see U.S. Pat. No. 4,636,609 which is expressly incorporated herein by reference). Lasers provide a focused beam of electromagnetic radiation at a specified frequency (i.e., coherent monochromatic radiation). However, lasers tend to be more expensive relative to other heating sources.

Less expensive heating sources, such as infrared heating lamps, are also used to provide infrared radiation for heating the welding zone. One such process is Through-Transmission Infrared Welding (TTIR). The TTIR technique utilizes infrared radiation which passes through at least one plastic part (sometimes called the "transmission piece") in order to heat the welding zone and to provide sufficient heat to join at least two parts.

Infrared heating lamps emit noncoherent radiation which has a broader frequency range (i.e., polychromatic) than laser sources. Some of the frequencies within that broader range produce undesirable results. These undesirable results include heating portions of the parts which are outside of the desired or targeted welding zone. This can result in undesirable effects, including deformation and marking of the overall part.

Solid filters have been used to absorb these undesirable frequencies before the radiation reaches the parts. However, solid filters suffer from several disadvantages, including uncontrolled build-up of heat, as well as having to be continually replaced due to the damage or degradation caused by the radiation or heat by-product. The degradation of the solid filter over a period of time inhibits the performance of the solid filter to absorb the undesirable wavelengths. It is also difficult to adequately cool solid filters in many applications.

A primary object of the present invention resides in the provision of an improved welding apparatus and method utilizing a filter of unique design which obviates the disadvantages of the aforementioned prior filters and is less costly.

Additional advantages and features of the present invention will become apparent from the subsequent description and the appended claims, taken in conjunction with the accompanying drawing in which:

DESCRIPTION OF THE PREFERRED EMBODIMENTS

Figure 1:
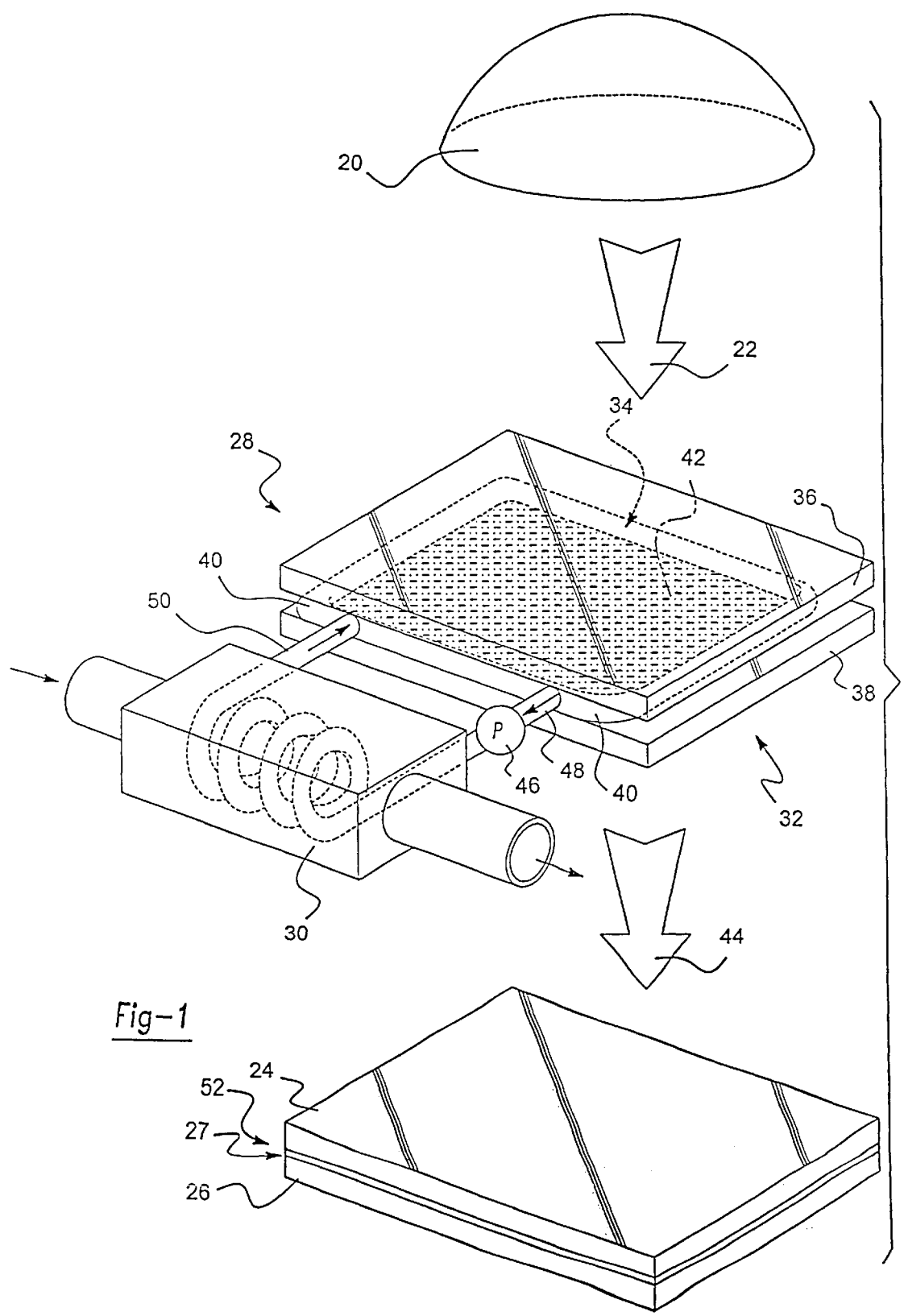
FIG. 1 is a diagrammatic perspective view depicting the apparatus employing the present invention.

Referring to FIG. 1, there is disclosed a welding apparatus comprising a radiant heating lamp 20 which emits noncoherent polychromatic electromagnetic radiation 22 in order to weld a first part 24 to a second part 26 at welding zone 27. A uniquely designed filter 28 is disposed between the radiant heating lamp 20 and the first part 24 to absorb undesired wavelengths included in radiation 22. A heat exchanger 30 is provided to maintain filter 28 within a desired temperature range while filter 28 is in use.

Filter 28 includes a filter housing 32 having a chamber 34 defined by a first plate 36 and a second plate 38, the first and said second plates being generally parallel or equidistant, and a peripheral seal 40 disposed therebetween. First plate 36 and second plate 38 transmit substantially all of the wavelengths of radiation 22 that is employed to heat welding zone 27. Optionally, a clamp (not shown) can be used to maintain the structural integrity of the filter housing 32 by clamping the first plate 36 to the second plate 38.

In accordance with the present invention, chamber 34 contains a fluid 42 which filters part of radiation 22 emanating from radiant heating lamp 20. Fluid 42 in filter 28 produces filtered radiation 44 by absorbing substantially all of the undesired wavelengths of radiation 22 before it can reach first part 24.

In a TTIR application, the first part 24 transmits the filtered radiation 44 to welding zone 27. The filtered radiation 44 heats the welding zone 27 in order to weld first part 24 to second part 26. Significantly, the absorption of the undesired wavelengths by fluid 42 which is preferably a liquid allows welding zone 27 to be adequately heated without the filtered radiation 44 causing overall damage to or undesired effects in first part 24 or second part 26.

It will be appreciated by the skilled artisan that the selection of the particular fluid 42 will be dependent upon several factors, most importantly its ability to absorb the undesired or harmful wavelengths of the radiation 22 employed in the particular application. For example, in at least one preferred embodiment, fluid 42 should absorb the wavelengths of radiation 22 in the range from about 1 micron to about 5 microns for welding conventional thermoplastic polymeric materials. More preferably, fluid 42 should absorb the wavelengths of radiation 22 in the range from about 1.3 microns to about 4 microns for welding such polymeric materials.

Conventional polymeric materials which are particularly suited for welding by the practice of the present invention are preferably selected from the thermoplastic class of materials. These materials can be categorized in several ways. The preferred materials are generally classified as engineering thermoplastics (ETPs); they are also sometimes classified as thermoplastic elastomers (TPEs); thermoplastic polyolefins (TPO); and thermoplastic polyurethanes (TPUs). This would include such materials as polycarbonates, high heat polycarbonates, polycarbonate blends (e.g., polyurethane/polycarbonate blends), styrenes, styrene blends such as acrylonitrile-butadiene-styrene copolymers (ABS), polycarbonate/ABS blends, polyamides, polyamide blends, acrylic-styrene-acrylonitriles (ASAs); acrylonitrile-ethylene-propylene-styrenes (AEWS), styrene-acrylonitrile-copolymer, styrene-maleic anhydrides, and the like. In a highly preferred embodiment, they include (without limitation) such materials as polycarbonates, acrylics, and polystyrene materials.

When fluid 42 is a liquid, it should preferably have a relatively high boiling point so that it absorbs a significant amount of heat and also preferably does not evaporate or boil during the filtering process. Fluid 42 should have a boiling point (with pressure considerations being taken into account with respect to the following boiling points) of at least about 120° F., more preferably at least about 240° F., and ideally at least about 350° F., either under atmospheric conditions, or when contained in the chamber or system.

One such preferred filtering fluid is a mixture of liquids comprising dimethyl esters of glutaric, adipic, and succinic acids. Such a dimethyl ester mixture is available commercially and may be obtained from such sources as Du Pont under the tradename of Aliphatic Dibasic Esters; such materials are also known under the tradenames/synonyms of Dibasic Ester, Dibasic Ester Mixture, and DBF. Such materials are generally mixtures of materials of the formula $CH_3COO(CH_2)_nCOOCH_3$, wherein n is an integer value from about 1 to about 5, more preferably from about 2 to about 4. In a highly preferred embodiment, the fluid 42 is a mixture comprising about 55–75 percent (by weight) of dimethyl glutarate, about 10–25% dimethyl adipate, and about 19–26% dimethyl succinate.

Other examples of useful materials include materials selected from the group consisting of glycerol, ethyleneglycerol, dioctyl phthalate, tributyl phosphene, mineral, and mixtures or derivatives of these materials. However, it is to be understood that the present invention is not limited to this fluid nor to fluids of these absorption wavelengths or boiling points, but includes other fluids, such as but not limited to gas compositions, whose physical characteristics are sufficient to filter undesirable radiation from any heating source used in a welding operation for any appropriate material.

Additives may also be employed in the filtering fluid so long as they do not substantially degrade the absorption profile of the liquid in any materially adverse way. For example, viscosity modifiers, thermal and UV stabilizers, colorants, pigments, visual indicators, and the like may be employed.

First plate 36 and second plate 38 are preferably quartz plates which are obtainable from such sources as Quartz Scientific, Inc. These quartz plates have thicknesses of about one-eighth of an inch and are separated (or spaced) by a distance of one-eighth of an inch to one-fourth of an inch by seal 40. Seal 40 is a material which is substantially inert to fluid 42 and includes such materials as (but is not limited to) RTV silicone caulking.

It is to be understood, however, that the present invention is not limited to only quartz plates or to these dimensions or shapes. The present invention includes such other embodiments as those plates which transmit substantially all of the wavelengths of radiation 22 from the radiant heating lamp 20.

Another preferred embodiment of the present invention includes at least one of the plates being used as a solid filter, providing some of the filtering function; in such embodiments the fluid acts as both a partial filter and as a cooling or heat transfer agent. For example, first plate 36 and second plate 38 may be of substantially the same material as first part 24 (or at least the plates should have substantially the same absorption profile as first part 24). Accordingly, if first part 24 is a polycarbonate plastic part, then first plate 36 and second plate 38 are also polycarbonate plastic parts. In this embodiment, fluid 42 filters the undesired wavelengths of radiation 22 in addition to the filtering provided by first plate 36 and second plate 38.

Chamber 34 has the following dimensions: one-fourth of an inch by twelve inches by one-eighth of an inch. However, it is to be understood that the dimensions of chamber 34 vary according to the particular application. Also in a preferred embodiment, about one-hundred percent of chamber 34 was filled with the Dibasic Ester fluid from Du Pont. Additionally, in a preferred embodiment, radiant heating lamp 20 is an ELC 250 watt 24 volt ac quartz-halogen General Electric reflector lamp, having either a multilayer dichroic coating for selectively reflecting preferred wavelengths, or an aluminized coating for reflecting relatively all visible and infrared radiation from the quartz-halogen source.

A heat exchanger 30 is connected in fluid communication to filter 28 in order to cool fluid 42 while fluid 42 is absorbing the undesired wavelengths from radiation 22. Pump 46 is preferably disposed in a supply line 48 between chamber 34 and heat exchanger 30. The present invention also includes other techniques besides using pump 46 to transport fluid 42 between chamber 34 and heat exchanger 30, such as but not limited to, transportation of fluid 42 through standard convection techniques.

A return line 50 returns the cooled fluid to chamber 34. Any conventional heat exchanger 30 and pump 46 may be used in accordance with standard practices. During the filtering operation, heat exchanger 30 preferably maintains fluid 42 in a predetermined temperature range, e.g., preferably from about 65° F. to about 120° F. The continual removal of heated fluid from filter 28 with the resupply of cooled fluid into filter 28 provides filter 28 with a longer operational life than that experienced by known solid filters.

EXAMPLE

Referring back to FIG. 1, the present invention is specially well-suited for the TTIR welding of a first plastic part to a second plastic part. In one exemplary use of the present invention, first part 24 is a transmitting plastic 24 which is to be welded to second part 26. Transmitting plastic 24 has the characteristic of absorbing little of the filtered radiation 44 as it transmits the filtered radiation 44 to the welding zone 27. For this example, transmitting plastic 24 and second part 26 may be polycarbonate plastic parts.

An absorbing material 52 is placed in welding zone 27 to generate heat upon the filtered radiation 44 reaching the welding zone 27. Sufficient heat is generated by the absorbing material 52 so as to weld the transmitting plastic 24 to the second part 26. The absorbing material 52 contains carbon black; however, other absorbing materials can be used which would generate sufficient heat to weld the parts.

For this example, the radiant heating lamp 20 was operated in the following manner (with filter 28 in place) in order to weld the transmitting plastic 24 to the second part 26: radiant heating lamp 20 was operated at eighty percent to ninety percent of its rated voltage level to heat the absorbing material 52 (a ramp time of one-half to one second was used); radiant heating lamp 20 remained at that level between about six to about nine seconds; and radiant heating lamp 20 was operated at between about five percent to about thirty percent of its rated voltage level during the idle portions of the welding cycle.

Operation of radiant heating lamp 20 in the aforementioned manner substantially increased the useful life of the radiant heating lamp 20. However, it is to be understood that the present invention is not limited to these operational ranges. The operational ranges may vary depending upon the particular radiant heating lamp 20 used and the parts to be welded. For example, the present invention includes operating radiant heating lamp 20 to heat absorbing material 52 within a voltage range which has a lower limit of about sixty percent of the voltage level rating of the radiant heating lamp 20.

The present invention also includes those TTIR applications wherein the second part 26 itself contains absorbing material 52 at least sufficiently near to the welding zone 27 so as to generate the heat needed to weld the transmitting plastic 24 to the second part 26.

With respect to these types of uses, the fluid 42 employed in the preferred embodiment is a liquid polymeric or prepolymer material whose absorption properties or profile are as close as possible to the transmitting plastic 24. In some instances, it may be possible to use a prepolymer comprising one or more of the same monomers as the transmitting plastic 24. Further, suitable derivatives of the monomers may be employed. Additionally, the fluid 42 employed in the preferred embodiment transmits those wavelengths of the radiation 22 which are needed by the absorbing material 52 to heat welding zone 27.

The embodiments which have been set forth above were for the purpose of illustration and were not intended to limit the invention. For example, the present invention is not limited to only welding applications, but includes those applications where filtering of undesired wavelengths is desired. Moreover, it will be appreciated by those skilled in the art that various changes and modifications may be made to the embodiments discussed in the specification without departing from the spirit and scope of the invention as defined by the appended claims.

It is claimed:

1. A filter for filtering electromagnetic radiation used to heat a welding zone, comprising:
   a filter housing which defines a chamber; and
   a fluid disposed in said chamber, said fluid absorbing predetermined wavelengths of said radiation before said radiation reaches said welding zone.

2. The filter according to claim 1 further comprising:
   a heat exchanger in fluid communication with said filter housing for reducing the temperature of said fluid.

3. The filter according to claim 2 further comprising:
   pump means connected to said filter housing and to said heat exchanger for pumping said fluid between said filter housing and said heat exchanger.

4. The filter according to claim 1 wherein said filter housing includes first and second plates defining said chamber for transmitting said radiation.

5. The filter according to claim 4 wherein said first and second plates transmit substantially all wavelengths of said radiation.

6. The filter according to claim 5 wherein said first and second plates are quartz plates sealed together to form said chamber.

7. The filter according to claim 1 wherein said fluid is a liquid, said liquid having a boiling point above 120° F.

8. The filter according to claim 7 wherein said liquid is a mixture of dimethyl esters of glutaric, adipic and succinic acids.

9. The filter according to claim 1 wherein said fluid absorbs the wavelengths of radiation above at least 1 micron.

10. The filter according to claim 9 wherein said fluid absorbs the wavelengths of radiation from at least about 1.2 microns to about 4 microns.

11. The filter according to claim 10 wherein said fluid is a mixture of liquid, said liquid being dimethyl esters of glutaric, adipic and succinic acids.

12. The filter according to claim 1 wherein said fluid is a mixture of liquid, said liquid being dimethyl esters of glutaric, adipic and succinic acids.

13. The filter according to claim 1 wherein the wavelengths of said radiation are substantially within the infrared electromagnetic spectrum.

14. The filter according to claim 1 wherein said radiation is produced from a radiant heating lamp.

15. The filter according to claim 1 wherein said welding zone defines an area for welding a first and second plastic part, said first part transmitting substantially all wavelengths of said filtered radiation.

16. The filter according to claim 15 wherein said second part absorbs second predetermined wavelengths of said radiation.

17. The filter according to claim 15 wherein said welding zone includes an absorbing material which is heated to weld said first and second part.

18. The filter according to claim 17 wherein said radiation is produced from a radiant heating lamp, said filter further comprising:
   a heat exchanger in fluid communication with said filter housing for reducing the temperature of said fluid.

19. A welding apparatus for heating a welding zone comprising:
   a heating lamp; and
   a filter for filtering electromagnetic radiation emitted from the heating lamp, wherein the filter includes a filter housing defining a chamber and a fluid disposed in the chamber for maintaining the filter housing within a predetermined temperature range and absorbing predetermined wavelengths of the radiation before the radiation reaches the welding zone,
   wherein the filter transmits filtered electromagnetic radiation to the welding zone.

* * * * *